June 20, 1961 W. H. DOHERTY 2,989,622

HYBRID SIDEBAND FREQUENCY MODULATION SYSTEM

Filed Dec. 29, 1958

INVENTOR
W. H. DOHERTY
BY [signature]
ATTORNEY 2,989,622

HYBRID SIDEBAND FREQUENCY MODULATION SYSTEM

William H. Doherty, Summit, N.J., assignor to Bell Telephone Laboratories, Incorporated, New York, N.Y., a corporation of New York Filed Dec. 29, 1958, Ser. No. 783,383

7 Claims. (Cl. 250—6)

Figure 1:
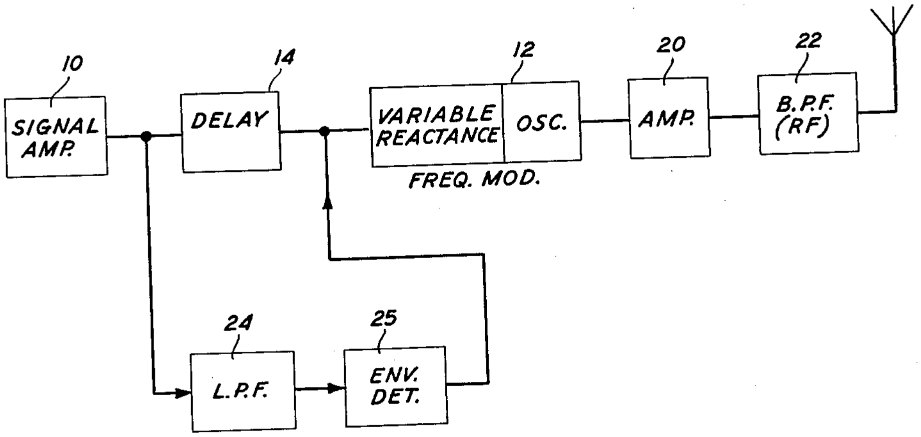

This invention relates to frequency modulation radio systems and more particularly to low deviation systems in which relatively narrow radio frequency transmission bands are employed.

As the utilization of radio communication systems increases, the available frequency space becomes more crowded and there has developed a high degree of interest in conservation of the available frequency bands. One approach to this problem has been the recent increased use of single sideband amplitude modulation systems. Such systems afford a saving in total frequency band required for the transmission of a given signal frequency spectrum but introduce various fairly stringent requirements on the transmitting equipment. At the same time, single sideband amplitude modulation systems fail to overcome certain of the disadvantages of amplitude modulation systems in general such as, for example, the susceptibility to fading and noise.

It has been well known that frequency modulation systems are relatively immune to noise when relatively broad radio frequency bands are employed for the transmission of a given signal. It has been noted that limitation of the radio frequency band to a width of approximately twice the signal band to be transmitted, the same as with double sideband amplitude modulation, may be accomplished with some noise advantage over amplitude modulation, due to the "triangular noise spectrum" characterizing frequency modulation, and also with the anti-fading advantage characterizing frequency modulation.

The object of the present invention is to reduce the radio frequency band required for the transmission of a given signal by frequency modulation techniques while preserving the advantageous characteristics of frequency modulation.

In accordance with the invention, therefore, low deviation frequency modulation signals are transmitted in a radio frequency band which is restricted to a width approximating that of the modulating signal. The adverse effects of such limitation are offset by normally positioning the unmodulated carrier frequency at or near one limit of the radio frequency band and shifting this frequency to or toward the center of that band whenever a low frequency modulating wave is present. Thus, for low frequency modulating wave components, frequencies are transmitted in both sidebands. For high frequency modulating wave components, transmission occurs in one or the other sideband, depending upon the location of the carrier (in dependence upon low frequency components) at the particular instant in question.

At the receiver, the hybrid signal produced as outlined above, may be converted to the signal required by a relatively conventional frequency modulation receiver in which the automatic frequency control is normally biased to place the intermediate frequency carrier at or near one edge of the intermediate frequency band. A low-pass filter and envelope detector sampling the output of the signal detector serve to provide a control D.-C. or syllabic signal representative of the strength of the low frequency components to oppose the bias in the automatic frequency control loop and to shift the local oscillator frequency in correspondence with shifts in the carrier produced at the transmitter.

Figure 2:
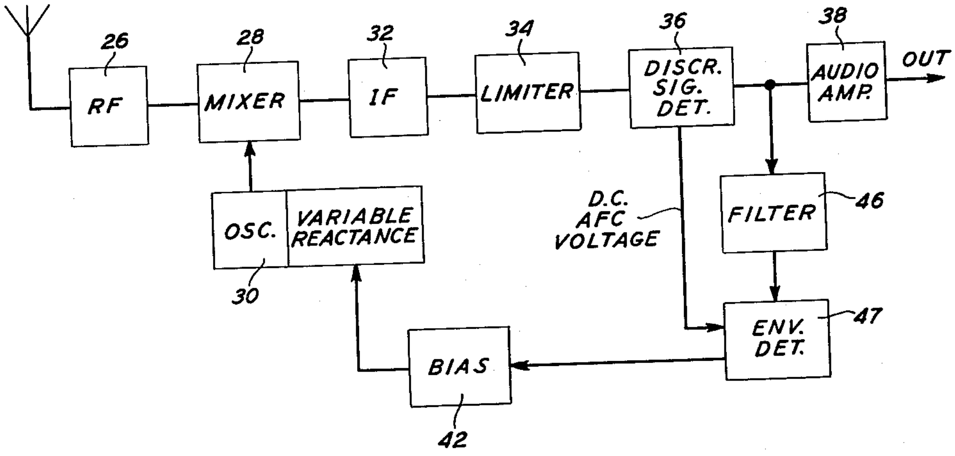

The above and other features of the invention will be described in detail in the following specification taken in connection with the drawing in which:

FIG. 1 is a block diagram of a transmitter in accordance with the invention; and FIG. 2 is a block diagram of a receiver appropriate for use in conjunction with the transmitter of FIG. 1.

As shown in FIG. 1, a message signal such as speech, is applied to the transmitter through an audio amplifier 10 and reaches the input of a frequency modulator 12 of conventional type consisting of an oscillator and reactance control tube. A delay element 14 may be inserted between the audio amplifier 10 and the frequency modulator 12, if required, for purposes which will be discussed hereinafter. The output of the frequency modulator 12 is applied to an RF power amplifier 20 and thence to a band pass filter 22. Filter 22 has a pass band substantially equal in width to the band of frequencies making up the signal applied to amplifier 10. Power amplifier 20 may conveniently include the band pass filter 22.

Normally, the frequency of the carrier oscillator included in frequency modulator 12 is adjusted to fall at or near one limit, conveniently the lower limit, of the radio frequency pass band of power amplifier 20 and filter 22. Under these circumstances, it will be apparent that only the carrier and components in one sideband can be radiated. This would have the effect of introducing serious distortion in high amplitude low frequency components of the message signal since these require large frequency excursions both above and below the carrier or mean frequency in order to be faithfully reproduced. On the other hand, high frequency components, such as the sibilants of speech, are normally of low amplitude and suffer relatively small distortion when the frequency-modulated wave is limited to components in a single sideband. Moreover, it is characteristic of frequency modulation that when the modulating frequency is high (deviation ratio low) the resultant wave is characterized by small phase deviations which do not require both sidebands for faithful reproduction. In any event, the distortion introduced by clipping one sideband for high frequency components is not serious and a substantial proportion of the harmonics produced fall outside the transmission band.

Distortion of the low frequency components is avoided in accordance with the invention by providing means for shifting the carrier frequency to the center or toward the center of the pass band whenever a low frequency component is to be transmitted. When such a shift in the carrier frequency is produced, the frequency can then be swung in either direction so that the low frequency components are transmitted effectively on a double sideband basis and are not distorted. To this end, a sample of the output of amplifier 10 is transmitted through a low pass filter 24 to an envelope detector 25 of conventional type which delivers to frequency modulator 12 a D.-C. or syllabic biasing signal representative of the amplitude of the low frequency components, thus producing the required shift in carrier frequency. The limits of filter 24 are determined by the nature of the message information to be transmitted. If, for example, the message signals to be transmitted are speech waves, low pass filter 24 might have a cut-off frequency in the range from 500 to 1,000 cycles, thus activating the envelope detector only in the presence of voiced or vowel sounds which it is important to transmit without distortion. In any event, the output of envelope detector 25 following filter 24 is a signal suitable for use in controlling frequency modulator 12 in a manner appropriate to produce shifting of the carrier frequency toward the center of the band as the amplitude of the low frequency components increases.

It may be desirable for highest quality to introduce a delay between the output of amplifier 10 and the input of frequency modulator 12 so that the carrier shift produced by the auxiliary circuit just described may occur at the proper time to accommodate low frequency signal components. It is for this purpose that delay element 14, referred to above, may be employed.

The effect of the frequency shifting arrangement described above may now be considered. It is clear that for a low frequency signal of the maximum possible amplitude, the carrier will be shifted to the middle of the radio frequency pass band and frequencies corresponding to the low frequency component will appear in both sidebands at the output of the modulator since the carrier can then be given full excursion in both directions. If the input signal consists entirely of high frequency components, on the other hand, the carrier frequency will remain at one limit of the pass band and these high frequency components will be transmitted on what amounts to a single sideband basis.

If the input signal simultaneously includes both high and low frequency components, then the transmission afforded to high frequency components will depend upon the instantaneous position of the radio frequency which is being swung over the band by the low frequency components. Thus the high frequency components may appear in one sideband or the other and may be switched between the two at a rate related to the frequency of whatever low frequency components are present. At those instants when the combined low frequency components are crossing the zero axis, some of the highest frequency components will be momentarily suppressed in the band pass filter but will reappear as the frequency is swung toward one extreme or the other. The high frequency components are thus chopped up or modulated and this represents distortion which, however, because of the high rate of chopping and the low amplitude of such components is not objectionable for the transmission of speech and similar message signals.

The receiver for signals of the type produced by the transmitter of FIG. 1 is shown in block form in FIG. 2. It comprises the conventional elements found in known frequency modulation receivers, namely, an RF amplifier 26, a mixer 28, a local oscillator 30, an intermediate frequency amplifier 32, a limiter 34, a discriminator-signal detector 36, and an audio frequency or signal amplifier 38 interconnected in conventional manner. In addition, the output of the discriminator-signal detector 36 may be applied to an automatic frequency control circuit which serves to adjust the frequency of the local oscillator to hold the intermediate frequency carrier at a predetermined point within the pass band of the intermediate frequency amplifier.

In accordance with the present invention, a bias from a battery or equivalent source indicated at 42 is applied to the variable reactance associated with oscillator 30 and serves normally to place its frequency so that the output of the mixer, in the absence of modulation, is at or near one limit of the intermediate frequency amplifier pass band. When only high frequency modulating components are present in the signal received from the transmitter, the frequency of the local oscillator 30 remains so adjusted. The output of the discriminator-signal detector is then a reproduction of the high frequency modulating component at the transmitter plus a small amount of distortion which, however, is not objectionable.

Provision for the reception of signals including low frequency components is made through the use of an envelope detector 47 which samples the output of discriminator-signal detector 36 and provides a direct or syllabic current which is applied to local oscillator 30 in opposition to the bias from source 42. A suitable low-pass filter 46 having a characteristic similar to filter 24 at the transmitter is inserted ahead of envelope detector 47 so that its D.-C. or syllabic output is proportional to only the low frequency components of the message signal. This output is combined with the AFC voltage from discriminator-signal detector 36 and applied to oscillator 30 in opposition to the bias voltage from source 42. When such components are present, therefore, the frequency of the local oscillator 30 is adjusted to bring the intermediate frequency carrier toward the center of the pass band of the intermediate frequency amplifier 32. Both sidebands of low frequency signals are present in the received radio frequency wave, as will be obvious from a consideration of the operation of the transmitter, and when the local oscillator 30 of the receiver is adjusted in the manner just described, both of these sidebands will reach the discriminator-signal detector to produce an undistorted reproduction of such low frequency components.

The system described above makes possible the use of frequency modulation with its intended advantages for the transmission of message waves in a radio frequency band of approximately the same width as the frequency band in which the signals occur. The anti-noise and anti-fading features of frequency modulation are preserved and the band economy of single sideband amplitude modulation systems is obtained.

What is claimed is:

1. A frequency modulation communication system for transmitting message signals within a limited radio band comprising a frequency modulation transmitter and receiver, means at the transmitter for limiting the radio frequency band radiated to a width approximating that of the signals to be transmitted, the unmodulated carrier frequency of said transmitter normally falling near one limit of said radio frequency band, means for shifting the carrier frequency toward the center of said radio frequency band when low frequency components are present in the signal, and means at the receiver for adjusting the frequency of the intermediate frequency carrier in correspondence with variations in the frequency of the carrier at the transmitter produced in response to low frequency signal components.

2. A frequency modulation communication system for transmitting message signals within a limited radio band comprising a frequency modulation transmitter and receiver, means at the transmitter for limiting the radio frequency band radiated to a width approximating that of the signals to be transmitted, the unmodulated carrier frequency of said transmitter normally falling near one limit of said radio frequency band, means for shifting the carrier frequency toward the center of the radio frequency band in response to changes in amplitude of the low frequency components of the signal, and means at the receiver for controlling the frequency of the local oscillator to position the intermediate frequency carrier within the intermediate frequency band in correspondence with variations in the transmitter carrier frequency produced by low frequency components in the signal.

3. In a frequency modulation communication system for transmitting signals within a limited radio frequency band, a frequency modulation transmitter, means for limiting the radio frequency band radiated therefrom to a width approximating that of the signals to be transmitted, means normally maintaining the unmodulated carrier frequency of said transmitter near one limit of said radio frequency band, and means for shifting the carrier frequency toward the center of the radio frequency band when low frequency components occur in the signal.

4. In a frequency modulation communication system for transmitting signals within a limited radio frequency band, a frequency modulation transmitter, means for limiting the radio frequency band radiated thereby to a total width substantially equal to that of said signals, means normally adjusting the unmodulated carrier frequency of said transmitter to fall near one limit of said radio frequency band, means for sampling the signals to be transmitted and producing an output proportional to the low frequency components therein, and means responsive to said output for shifting a carrier frequency toward the center of said radio frequency band by an amount proportional to the amplitude of said output.

5. In a transmitter for frequency modulation signals within a radio band limited to approximately the same width as the band of modulating frequencies, a frequency modulator, a source of modulating signals, a source of carrier signals the frequency of which is normally near one extreme of said radio band, means for applying said carrier frequency and said modulating signals to said modulator for the production of frequency-modulated carrier signals, means for detecting low frequency components in said modulating signals, and means responsive to the output of said detecting means for shifting the frequency of said carrier toward the center of said radio band.

6. In a frequency modulation communication system for transmitting signals within a limited radio frequency band of approximately the same total width as said signals, means for producing frequency modulation signals from said signals, the carrier frequency of which normally falls near one limit of the radio frequency band and departs therefrom in proportion to the amplitude of low frequency components present in the signal, a frequency modulation receiver, means normally adjusting the frequency of the local oscillator therein to cause the intermediate frequency carrier normally to fall near one limit of the intermediate frequency band, means for sampling the demodulated output of said receiver to detect variations in the amplitude of the low frequency components therein, and means responsive to said sampling means for shifting the intermediate frequency carrier toward the center of the intermediate frequency band in response to changes in the amplitude of said low frequency components.

7. In a receiver for frequency modulation signals transmitted in a radio frequency band of total width approximating that of the signal by shifting the transmitter frequency from one limit of the radio frequency band toward the center thereof in proportion to the amplitude of low frequency components in the signal, said receiver comprising at least a mixer stage, a source of local oscillations, an intermediate frequency amplifier, a discriminator-signal detector, means for sampling the output of said discriminator-signal detector to produce a control signal the amplitude of which varies only with the amplitude of low frequency components in said output, an automatic frequency control for said source of local oscillations, means normally adjusting said automatic frequency control to place the frequency of the intermediate frequency carrier near one limit of the pass band of said intermediate frequency amplifier, and means responsive to said control signal to shift the frequency of the intermediate frequency carrier toward the center of the intermediate frequency pass band when low frequency components are present at the output of said discriminator.

References Cited in the file of this patent

UNITED STATES PATENTS

| | | |
|---|---|---|
| 2,014,081 | Csepely | Sept. 10, 1935 |
| 2,283,523 | White | May 19, 1942 |
| 2,296,919 | Goldstine | July 17, 1942 |
| 2,315,050 | Grosby | Mar. 30, 1943 |
| 2,379,720 | Koch | July 3, 1954 |
| 2,708,716 | Boothroyd | May 17, 1955 |

FOREIGN PATENTS

| | | |
|---|---|---|
| 528,152 | Great Britain | Oct. 23, 1940 |